United States Patent [19]

Yuasa

[11] 4,262,997

[45] Apr. 21, 1981

[54] EXPOSURE INFORMATION INDICATING DEVICE

[75] Inventor: Yoshio Yuasa, Kawachinagano, Japan

[73] Assignee: Minolta Camera Kabushiki Kaisha, Osaka, Japan

[21] Appl. No.: 10,978

[22] Filed: Feb. 9, 1979

[30] Foreign Application Priority Data

Feb. 22, 1978 [JP] Japan .................................. 53/20302

[51] Int. Cl.³ .......................... G03B 17/18; G01J 1/44
[52] U.S. Cl. ............................... 354/23 D; 354/60 L; 356/226
[58] Field of Search ............. 354/230, 53, 60 L, 60 E; 356/226

[56] References Cited

U.S. PATENT DOCUMENTS

| | | | |
|---|---|---|---|
| 3,895,875 | 7/1975 | Kitaura et al. | 354/53 |
| 3,909,137 | 9/1975 | Kisanuki | 354/23 D X |
| 4,135,795 | 1/1979 | Uno et al. | 354/23 D |

Primary Examiner—L. T. Hix
Assistant Examiner—William B. Perkey
Attorney, Agent, or Firm—Wenderoth, Lind & Ponack

[57] ABSTRACT

An exposure information indicating device for use in photography includes a detecting section for detecting various known information values such as brightness or luminance of an object and film sensitivity represented by ASA number, a calculating section for calculating an unknown exposure information value such as f/stop number and a display section for digitally displaying the calculated value.

12 Claims, 10 Drawing Figures

EXPOSURE INFORMATION INDICATING DEVICE

BACKGROUND OF THE INVENTION

The present invention relates to an exposure information indicating device and, more particularly, to a photographic device for indicating the exposure information.

Generally, the calculation of exposure information is carried out under a first numbering system which is a so-called additive system of photographic exposure (APEX system) while the exposure information is expressed in a second numbering system. Therefore, it is necessary to convert the calculated APEX value under the first numbering system into the second numbering system. For example, in the case of aperture size, a numbering 1, 2, 3, 4, 5, 6, 7 and so on under the first numbering system, i.e., the APEX system, corresponds to numbering 1.4, 2.0, 2.8, 4.0, 5.6, 8.0, 11 and so on under the second numbering system. This second numbering system is well known as f/stop numbers.

Accordingly, in the conventional device, for the purpose of obtaining the values in the second numbering system with only the familiar numbers as described above, the calculated APEX value is approximated to an integral number.

For example, according to one conventional photographic device for indicating the exposure information, a plurality of reference levels are set for defining a plurality of regions between the two neighboring levels. A calculated value under the APEX system is compared with the reference levels for detecting a region in which the calculated APEX value falls. Thereafter, a previously set value of exposure information corresponding to the detected region is displayed through a suitable display means. For example, the display means can be 7-segment display elements coupled with decoders for digitally displaying the exposure information value or can be a spot illumination for pointing out one exposure information value from among a plurality of values. According to the above described conventional photographic device, the detected exposure information is not so precise, since one exposure information value represents all the calculated APEX values which fall in one region. Furthermore, since it is necessary to employ means for establishing a plurality of reference levels and to employ a particular circuit for the display means, the manufacturing cost therefor is quite high.

According to another conventional photographic device as disclosed in Japanese Laid-Open Patent Publication No. 58529/1977 published on May 14, 1977, the calculated APEX value is approximated to ½ of an integral number, that is, the calculated value may be one of 0, 1/2, 2/2, 3/2, 4/2, 5/2, ..., n/2 (n is an integer). With respect to the above numbering, the corresponding f/stop numbers will be somewhat like 1, 1.2, 1.4, 1.6, 2.0, 2.4, 2.8, 3.4, 4.0, 4.8, 5.6, 6.7, 8.0, and so on. However, when f/stop value 6.7 is displayed, it will not be simple for an operator to understand immediately whether the unfamiliar f/stop value 6.7 means an f/stop closer to 5.6 or to 8.0 or at the exact middle between f/stop values 5.6 and 8.0.

A similar photographic device is shown in U.S. Pat. No. 3,909,137 to Toru Kisanuki.

SUMMARY OF THE INVENTION

Accordingly, it is an important object of the present invention to provide an improved exposure information indicating device which can display the exposure information value with preciseness and yet employ the familiar exposure information values.

It is also an important object of the present invention to provide an exposure information setting device of the above described type which employs a simple system for converting the APEX value into an exposure information value or vice versa.

It is a further object of the present invention to provide an exposure information setting device of the above described type which is simple in construction and can readily be manufactured at low cost.

In accordance with a preferred embodiment of the invention, an exposure information setting device has a separation circuit for separating the calculated APEX value at a radix or decimal point for obtaining an integer value and a value below the decimal point. The value below the decimal point is displayed directly for the indication of precise value between the neighboring two familiar f/stop values while the integer value is converted into one of the familiar f/stop number. For carrying out the conversion, only the integer part of the f/stop value is separated for establishing an address in a read-only memory for indicating an area in which the converted value is contained. Therefore, it is not necessary to employ any reference setting circuit or comparator for effecting the conversion.

In accordance with a further preferred embodiment of the invention, an exposure information setting device for indicating the exposure information comprises first means responsive to the scene brightness for producing a first exposure information value in the ASA APEX system, second means responsive to a manual setting for producing at least a second exposure information value in the ASA APEX system, third means responsive to the first and second means for calculating a third exposure information value in the ASA APEX system from at least the first and second exposure information values, the third exposure information value including at least a figure composed of an integer component and a fraction component represented in the ASA APEX system, and fourth means responsive to the third means for separating the figure into the integer component and the fraction component. The device further comprises fifth means having a plurality of address memories for storing a series of various values, each corresponding to a series of various integer components for the third exposure information value in a form to be indicated, respectively, sixth means for designating one of the addressed memories of the fifth means in response to the integer component of the figure separated by the fourth means, seventh means for indicating the value stored in the addressed memory which is designated by the sixth means, and eighth means for indicating the fraction of the figure in accordance with the fraction component separated by the fourth means.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Needless to say the calculations of exposure information are according to the APEX system in the present invention.

Figure 1:
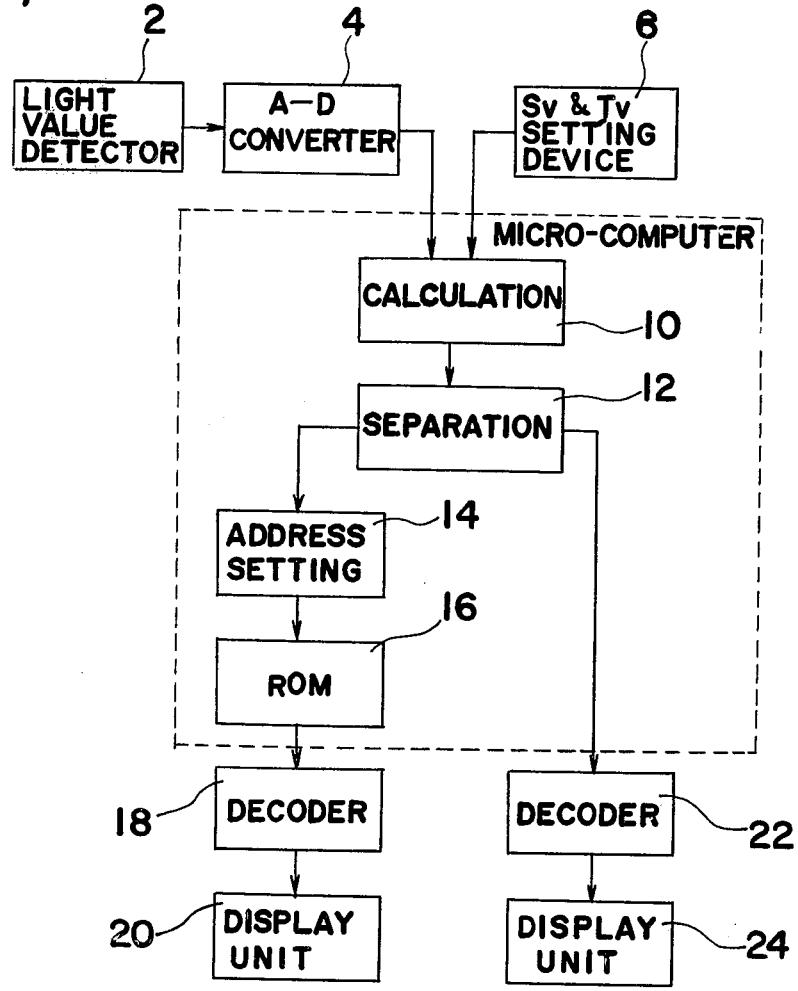
FIG. 1 is a block diagram of an exposure information setting system of the present invention shown in terms of functional dependence.

Referring to FIG. 1, the block diagram illustrates an embodiment of the exposure information indicating device of the present invention which comprises a light value detector 2 for detecting the brightness or luminance of an object, an analog-digital converter 4 (hereinafter, referred to as an A-D converter) connected to the light value detector 2 for converting the analog signal obtained from the light value detector 2 into a digital signal, and an Sv & Tv setting device 6 for setting the APEX values of the film sensitivity and shutter speed. Digital signals from blocks 4 and 6 are input to a calculation means 10 in which an unknown APEX value, for example, aperture APEX value Av is calculated. A separation means 12 is further provided, in which the calculated value is separated at the decimal or radix point. For example, if the calculated value is "3.7", two values "3" and "7" are obtained after the separation. The digit value "3" which is positioned to the left of the decimal point is transmitted to the address setting means 14 in which the value "3" is added to a predetermined value for presenting a value indicative of an address of a read-only memory 16 where it contains the f/stop number corresponding to the aperture APEX value of "3". The f/stop number corresponding to the aperture APEX value of "3", that is, 2.8, is read out from ROM 16 in the binary coded decimal (BCD) system and is displayed through a BCD-to-seven-segment decoder 18 on a display unit 20 of the seven-segment type. The value "7", which is positioned to the right of the decimal point, is directed to a BCD-to-seven-segment decoder 22 and, in turn, to a display unit 24 of the seven-segment type for the display of the value "7". This value "7" indicates that the actual f/stop number is not exactly the same as the number shown in the display unit 20, that is, 2.8, but that the actual f/stop number lies at a position seven degrees above the value 2.8, provided that the interval between the values 2.8 and 4.0 is divided into ten degrees.

However, it should be noted that the division of 1 Ev such as a value between 2.8 and 4.0 may be more roughly made if desired, e.g., four degrees. In this case, a three-dot type indicator may be used in place of the seven-segment type indicator 24 and decoder 22 may also be replaced by another suitable type of decoder.

As can be understood from the foregoing, the purpose of this separation is to exhibit the f/stop numbers with the familiar numbering of 1, 1.4, 2, 2.8, 4, 5.6, and so on, on the display unit 20, and yet effect a precise indication of the f/stop number by the indication of the degree of deviation between the two neighboring familiar f/stop numbers.

Figure 2:
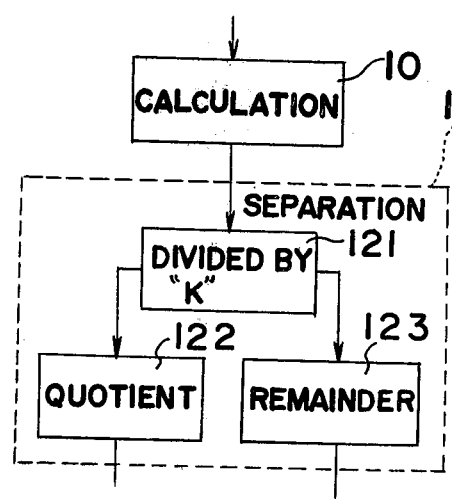
FIG. 2 is a detailed block diagram of a portion shown in FIG. 1.

Referring to FIG. 2, there is shown a detailed means for the separation means 12. The calculated result obtained from the calculation means 10 is divided by a radix "K" in a block numbered 121. The quotient and the remainder obtained after the division are taken out separately to blocks 122 and 123, respectively, for substantially separating the number above and below the radix point. According to the above example, the radix "K" is 10.

Figure 3:
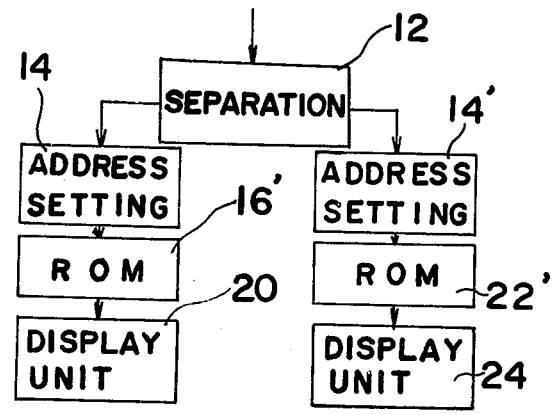
FIG. 3 is a modified block diagram of a portion shown in FIG. 1.

FIG. 3 shows a modification of a portion of the block diagram shown in FIG. 1, in which the ROM 16 is modified into a ROM 16' of a type which directly produces a signal for controlling the seven-segment type indicator 20 when an address designation is made by address setting means 14. In this case, decoder 18 is unnecessary. Furthermore, the decoder 22 of FIG. 1 can be replaced by an address setting means 14' and ROM 22', which achieve a function equivalent to that of decoder 22.

According to the present invention, the function of blocks 10, 12, 14 and 16 encircled by the broken line in FIG. 1 can be achieved by means of a microcomputer having a CPU, ROM, RAM and I/OP.

Figure 4:
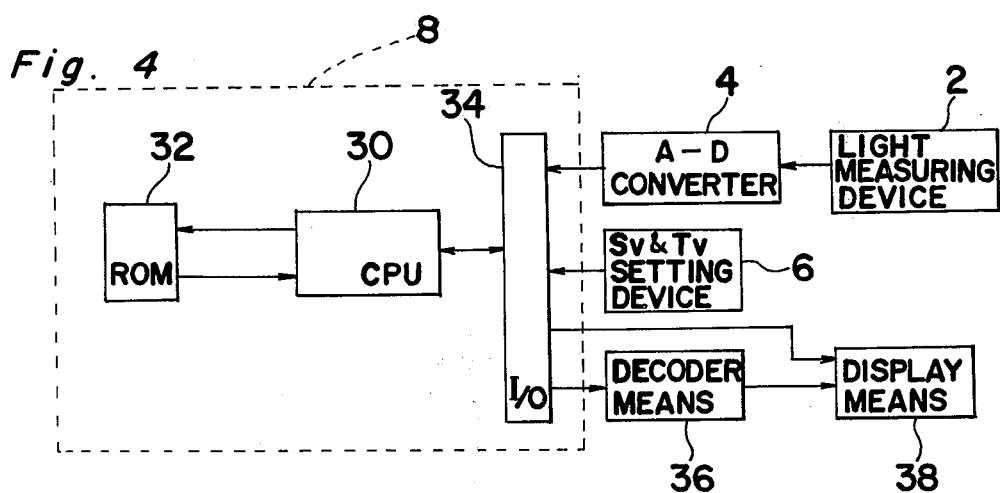
FIG. 4 is a block diagram of an exposure information setting device of the present invention.
Figure 5:
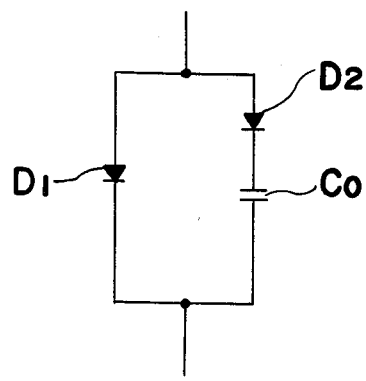
FIG. 5 is a circuit diagram of a charging capacitor employed in a device shown in FIG. 4.

Referring to FIG. 4, there is shown a schematic block diagram of an exposure information calculating device of the present invention which comprises a central processor unit (CPU) 30, a read-only memory (ROM) 32 coupled to the CPU 30, an input and output terminal means (I/OP) 34 which are included in the micro-computer 8. The exposure information setting device further comprises the light value detector 2 connected to the terminal means through the A-D converter 4 for providing luminance APEX value Bv to the micro-computer 8. According to a preferred embodiment, the light measuring device 2 includes, as shown in FIG. 5, diodes D₁ and D₂ and capacitor Co, which light measuring device 2 is described in detail in U.S. Pat. No. 3,574,443. The capacitor Co is so connected as to be charged current generated by a light receiving element. The Sv & Tv setting device 6 is connected to the computer for providing film sensitivity APEX value Sv and shutter speed APEX value Tv to the computer 8. Decoder means 36 connected to the micro-computer 8 is provided for converting the signal obtained from the computer 8 into a signal capable of actuating seven-segment display elements constituting the display unit, and display means 38 is coupled to the decoder means 36 for the indication of the f/stop number and other information such as a warning indication which is actuated when the detected aperture APEX value is out of a predetermined range.

Figure 6:
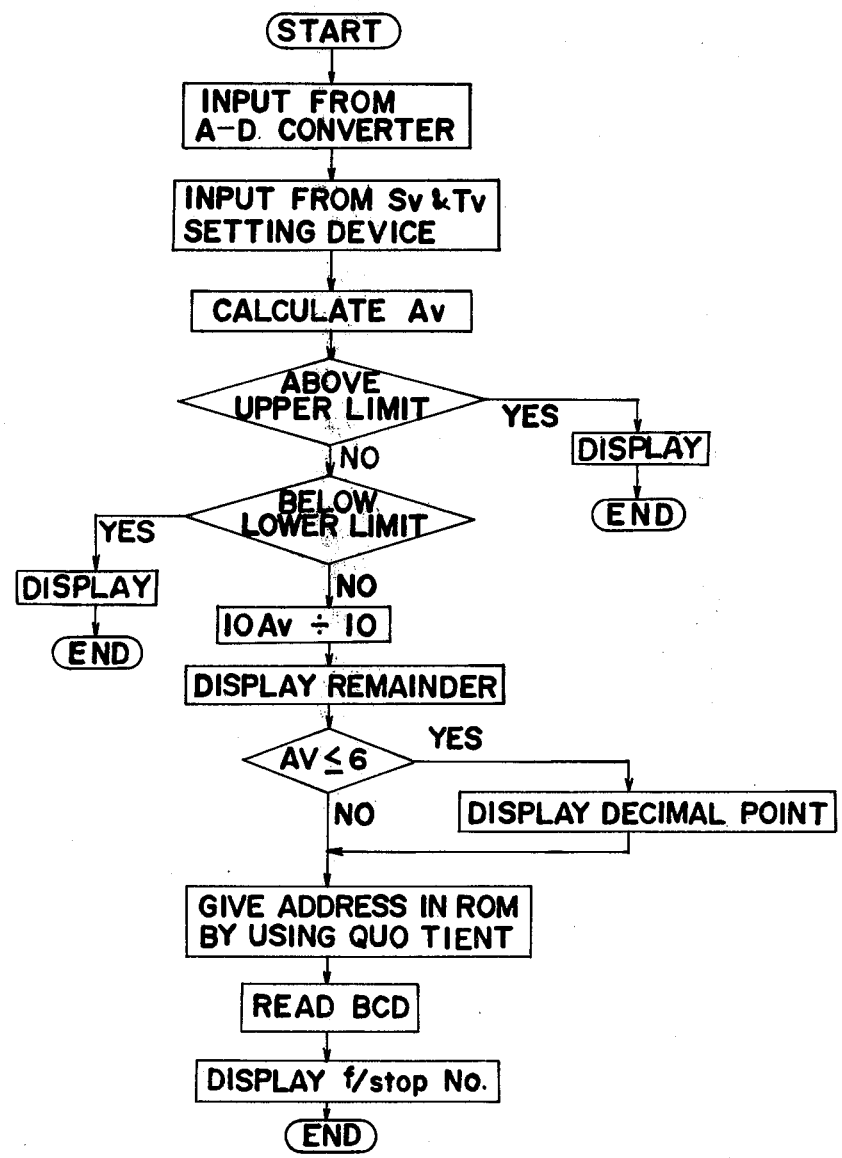
FIG. 6 is a flow chart for controlling the calculating process according to the system shown in FIG. 1.

Referring to FIG. 6, there is shown a flow chart which is previously set in the read-only memory 32 for controlling the calculating process of the micro-computer 8. Furthermore, the read-only memory 32 is previously programmed with data such as aperture information, film sensitivity information and shutter speed information shown in Tables 1, 2 and 3, respectively, given hereinbelow.

TABLE 1

| AV | AVAdd | F |
|---|---|---|
| 0 | $K_2$ + 00H | 1.0 |
| 1 | $K_2$ + 01H | 1.4 |
| 2 | $K_2$ + 02H | 2.0 |
| 3 | $K_2$ + 03H | 2.8 |
| 4 | $K_2$ + 04H | 4.0 |
| 5 | $K_2$ + 05H | 5.6 |
| 6 | $K_2$ + 06H | 8.0 |
| 7 | $K_2$ + 07H | 11 |
| 8 | $K_2$ + 08H | 16 |
| 9 | $K_2$ + 09H | 22 |
| 10 | $K_2$ + 0AH | 32 |
| 11 | $K_2$ + 0BH | 45 |
| 12 | $K_2$ + 0CH | 64 |
| 13 | $K_2$ + 0DH | 90 |

TABLE 2

| ASA | SVX | SVAdd | 10 . SV |
|---|---|---|---|
| 3200 | 00H | $K_1$ + 00H | 64H |
| — | 01H | $K_1$ + 01H | 61H |
| — | 02H | $K_1$ + 02H | 5DH |
| 1600 | 03H | $K_1$ + 03H | 5AH |
| — | 04H | $K_1$ + 04H | 57H |
| — | 05H | $K_1$ + 05H | 53H |
| 800 | 06H | $K_1$ + 06H | 50H |
| — | 07H | $K_1$ + 07H | 4DH |
| — | 08H | $K_1$ + 08H | 49H |
| 400 | 09H | $K_1$ + 09H | 46H |
| — | 0AH | $K_1$ + 0AH | 43H |
| — | 0BH | $K_1$ + 0BH | 3FH |
| 200 | 0CH | $K_1$ + 0CH | 3CH |
| — | 0DH | $K_1$ + 0DH | 39H |
| — | 0EH | $K_1$ + 0EH | 35H |
| 100 | 0FH | $K_1$ + 0FH | 32H |
| — | 10H | $K_1$ + 10H | 2FH |
| — | 11H | $K_1$ + 11H | 2BH |
| 50 | 12H | $K_1$ + 12H | 28H |
| — | 13H | $K_1$ + 13H | 25H |
| — | 14H | $K_1$ + 14H | 21H |
| 25 | 15H | $K_1$ + 15H | 1EH |
| — | 16H | $K_1$ + 16H | 1BH |
| — | 17H | $K_1$ + 17H | 17H |
| 12 | 18H | $K_1$ + 18H | 14H |

TABLE 3

| TIME | TVX | TIAdd | TI | TVIAdd | TVI = 10 (10-TV) |
|---|---|---|---|---|---|
| 1/1000 | 0 | | | $K_4$ + 00H | 00H |
| 1/500 | 1 | | | $K_4$ + 01H | 0AH |
| 1/250 | 2 | $K_3$ + 00H | 01H | $K_4$ + 02H | 14H |
| 1/125 | 3 | $K_3$ + 01H | 02H | $K_4$ + 03H | 1EH |
| 1/60 | 4 | $K_3$ + 02H | 04H | $K_4$ + 04H | 28H |
| 1/30 | 5 | $K_3$ + 03H | 08H | $K_4$ + 05H | 32H |
| 1/15 | 6 | $K_3$ + 04H | 10H | $K_4$ + 06H | 3CH |
| ½ | 7 | $K_3$ + 05H | 20H | $K_4$ + 07H | 46H |
| ¼ | 8 | $K_3$ + 06H | 40H | $K_4$ + 08H | 50H |
| ½ | 9 | $K_3$ + 07H | 80H | $K_4$ + 09H | 5AH |
| 1 | A | $K_3$ + 08H | FFH | $K_4$ + 0AH | 64H |
| 2 | B | | | $K_4$ + 0BH | 6EH |
| 4 | C | | | $K_4$ + 0CH | 78H |
| 8 | D | | | $K_4$ + 0DH | 82H |
| 16 | E | | | $K_4$ + 0EH | 8CH |

In these Tables 1, 2 and 3, the reference character H given after each number indicates the numbering system with base 16 which is called a hexadecimal numbering system. Since there are 16 digits in this system, six additional characters are used to represent digits, in addition to the ten numerical digits. In the hexadecimal numbering system, therefore, the digits are 0, 1, 2, 3, 4, 5, 6, 7, 8, 9, A, B, C, D, E, F.

In Table 1, reference character AV indicates the aperture APEX value while reference character F indicates the f/stop number. Reference character AVAdd indicates the address in the ROM 32 where the f/stop number corresponding to the aperture APEX value is included. The reference character $K_2$ is a predetermined constant value. For example, when the aperture APEX value is "5", the address $K_2$+05H is obtained. From this address, f/stop value 5.6 which is equivalent to the aperture APEX value 5 is obtained from the ROM 32. One operation of a device shown in FIG. 4 is described hereinbelow with reference to the flow chart shown in FIG. 6.

Upon receipt of light by the light value detector 2, and A-D converter 4 produces a digital signal indicative of luminance or brightness APEX value Bv and supplies it to the CPU 30. In the CPU 30, the digital signals indicative of film sensitivity APEX value Sv and shutter speed APEX value Tv are taken together with the digital signal indicative of the luminance APEX value Bv to calculate the following equation:

$$(Bv+Sv-Tv)\cdot 10 = 10\cdot Av \qquad (2)$$

for obtaining the aperture APEX value 10·Av. The obtained aperture APEX value 10·Av is compared with upper and lower limits 0 (00H) and 130 (80H), respectively, to define whether it is within a predetermined range or not. When the aperture APEX value 10·Av is above the upper limit 130, the display unit 38 is so actuated as to indicate that the aperture APEX value is above the limit and the procedure is ended. Similarly, when the aperture APEX value 10·Av is below the lower limit 0, it is so indicated by the display unit 38 and the procedure is ended.

When the APEX value 10·Av is within the range, that is 0(00H)≦10·Av<130(80H), the aperture APEX value 10·Av is divided by 10 in the following step for obtaining the quotient and remainder. One example for effecting the "divided by 10" procedure is described hereinafter.

The APEX value 10·Av is compared with a value 0AH which corresponds to a value 10. When 10·Av<0AH, the value 10·Av will be the remainder while a value 0 set up in a register (not shown) will be the quotient. On the other hand, when 10·Av≧0AH, a subtraction (10·Av−0AH) is carried out and, at the same time, a value 1 is set up in the register for the indication of the first subtraction.

The subtracted value (10·Av−0AH) is compared, again, with a value 0AH. When (10·Av−0AH)<0AH, the value (10·Av−0AH) will be the remainder while the value 1 set up in the register will be the quotient. On the other hand, when (10·Av−0AH)≧0AH, a subtraction (10·Av−0AH)−0AH is carried out and, at the same time, a value 2 is set up in the register for the indication of the second subtraction.

In a similar manner, the subtraction is carried out n times until the subtracted value (10·Av−n·0AH) becomes smaller than 0AH, that is, smaller than 10. Therefore, in general, the number n of times the subtraction is carried out as set up in the register gives the quotient while the final subtracted value (10·Av−n·Av) gives the remainder.

Thus obtained remainder is applied to the decoder means 36 for the indication of said remainder on the 7-segment display means 38. Since the remainder has a value between 0 and 9, an ordinary decoder for the binary-coded decimal (BCD) code can be employed.

The thus obtained quotient n indicating the aperture APEX value is compared with a value 06H. When n≦06H, the f/stop numbers are represented with decimal points, as shown in the Table 1, so that in this case, a decimal point is first given to the display means 38. Thereafter, the obtained quotient n is added to a predetermined value $K_2$ for presenting an address in the ROM 32 where the f/stop number corresponding to the aperture APEX value n is contained. For example, when n is "3", a section having the address of $K_2+3$ in the ROM 32 is read out for obtaining the f/stop number 2.8. This number is coded in the BCD code, so that the actual signal obtained from the ROM 32 is "0010 1000". This BCD code is decoded in the decoder means 36 and is digitally displayed on the display means 38.

Figure 7:
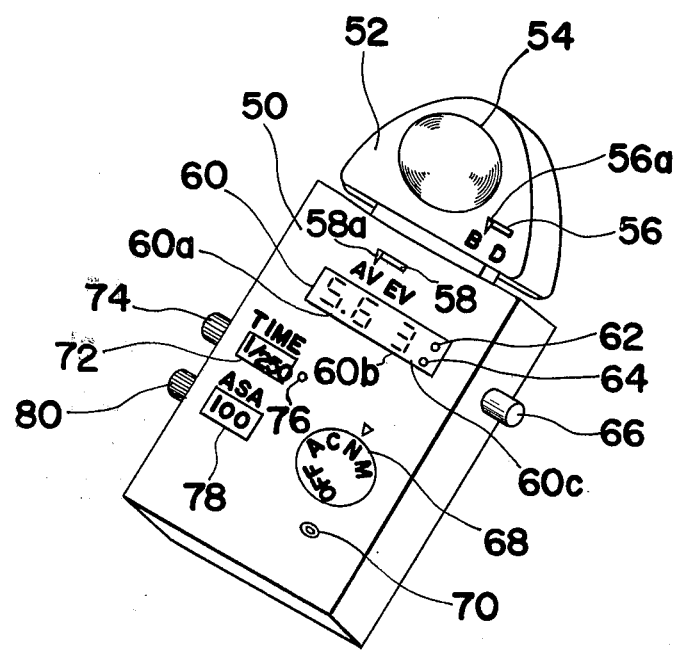
FIG. 7 is a perspective view of an exposure information setting device of the present invention.

Referring to FIG. 7, there is shown a perspective view of one embodiment of the exposure information calculating device according to the present invention. The device comprises a casing 50 having a box-like configuration and a head portion 52 firmly connected to the casing 50. A light receiving member 54 is mounted in the head portion 52. An incoming light selecting switch 56 positioned adjacent the light receiving member 54 is provided for being manually set by selectively turning a lever 56a between positions indicated as "B" and "D". When the lever 56a is shifted to the position "B" as shown, the light receiving member 54 is in a mode capable of receiving bounced light from a target object. On the other hand, when the lever 56a is shifted to the position "D", the light receiving member 54 is in a mode capable of receiving direct light from a light source (not shown) projected to the target object. A mode selecting switch 58 positioned at upper portion of the casing 50 has a lever 58a which can be selectively turned between positions indicated as "Av" and "Ev". When the lever 58a is shifted to the position "Av" as shown, the display will be effected by a value equivalent to an aperture APEX value such as by an f/stop value. On the other hand, when the lever 58a is shifted to the position "Ev", the display will be effected by a value equivalent to an exposure value Ev, that is, a value equivalent to (Bv+Sv).

A display window 60 located in the casing 50 is divided into three sections, the first section 60a located at left end portion including 7-segment display elements for exhibiting a value relative to the aperture APEX value such as an f/stop number or a value relative to the exposure value Ev. The second section 60b next to the first also includes a 7-segment display element for exhibiting a remainder or numbering located to the right of the radix point of the aperture APEX value or exposure value. The third section 60c located at the right end portion includes two spot lamps 62 and 64, the spot lamp 62 being provided for indicating that the light intensity is over the upper limit while the spot lamp 64 is provided for indicating that the light intensity is under the lower limit.

A double action pushing button 66 provided on the side of the casing 50 is provided for turning the device on and off by the first pushing action and for producing a start signal by a further pushing action for starting the calculation. A mode selecting dial 68 provided below the display window 60 has four setting positions A, C, N and M corresponding to modes A, C, N and M, respectively. When the dial 68 is set at the position A, the device is arranged in the mode A for measuring natural daylight. When the dial 68 is set at the position C, the device is arranged in the mode C for measuring a strobe flashing light. In the mode C, the strobe (not shown) having the cable thereof connected to a synchro terminal 70 positioned below the dial 68 is fired by the second pushing action of the button 66. This second pushing action also starts measuring the light. When the dial 68 is set at the position N, the device is arranged in the mode N for measuring the strobe flashing light upon receipt of the step-up of the flashing light. In this mode N, the strobe is fired independently of the device. Finally, when the dial 68 is set at the position M, the device is arranged in the mode M for measuring the total light value of a plurality of strobes fired one after another.

A window 72 is provided for displaying the shutter speed set by a dial 74 provided on the side of the casing 50. A lamp 76 provided closely adjacent the window 72 is provided for an indication of error in setting the shutter speed. More particularly, when the shutter speed is set to a value outside a predetermined range of 1/250 to 1 sec. such as 1/1000 or 2, the lamp 76 is lit to indicate the erroneous setting. A window 78 is provided for displaying film sensitivity, such as an ASA number, by a dial 80 provided on the side of the casing 50.

Figure 8:
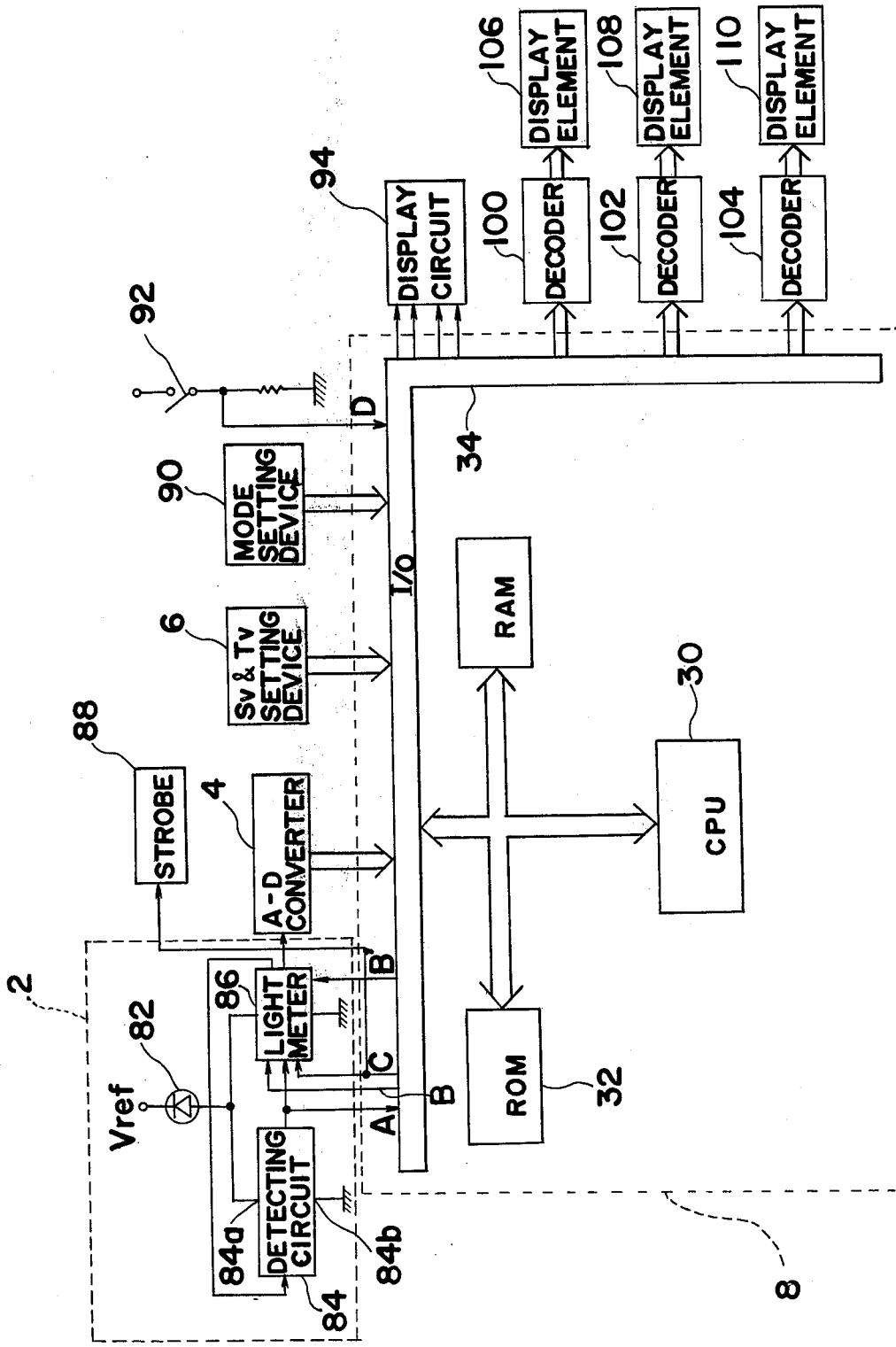
FIG. 8 is a detailed block diagram of the device shown in FIG. 7.

Referring to FIG. 8, there is shown a block diagram of the device shown in FIG. 7. The light value detector 2 comprises a light receiving element 82 such as a photodiode for receiving light and for producing a pulsating signal indicative of the received light and a detecting circuit 84 connected to the light receiving element 82. The detecting circuit 84 detects the step-up of the pulsating signal received from the light receiving element 82 for preventing the pulsating signal from passing through the detecting circuit 84 until the step-down of the pulsating signal. Therefore, the input 84a and output 84b of the detecting circuit will be disconnected during the presence of the pulsating signal from the light receiving element 82. The light value detector 2 further comprises a light meter 86, which is connected to the light receiving element 82, to computer 8 and to A-D converter 4. The light meter 86 includes the capacitor Co (FIG. 5) for being charged by the current received from the light receiving element 82 in response to a signal obtained from the detecting circuit 84 or from terminal C of the terminal means 34. During the time the capacitor is being charged, the light meter 86 maintains the detecting circuit 84 in the disconnected condition. The capacitor Co is kept charged until a stop signal is obtained from terminal B of the terminal means 34. The charged voltage across the capacitor Co is applied to the A-D converter 4 for converting the voltage into a digital value. Thereafter, the capacitor Co is discharged by a signal obtained from terminal B' of the terminal means 34.

According to one embodiment, the A-D converter 4 has an analog processing portion externally connected to the computer 8 while the digital processing portion is contained in the computer 8.

A strobe 88, connected to the terminal C (corresponding to the synchronous terminal 70 in FIG. 7) is synchronizingly fired by the signal produced from the terminal C. A mode setting device 90 provides a digital signal indicative of the mode selected by the switches 56 and 58 and the dial 68. A switch 92 is coupled to the double action pushing button 66 in such a manner that the switch 92 is closed by a second pushing action on the button 66. A display circuit 94 is connected to the output of the computer 8 for effecting the display of the spot lamps 62 and 64 for the indication of out of range, the lamp 76 for the indication of error in setting the shutter speed and a decimal point in the first section 60a of the display window 60.

Three decoders 100, 102 and 104 are connected to the output of the computer 8 and which are in turn connected to 7-segment display elements 106, 108 and 110. The first decoder 100 and display element 106 are employed for the indication of the first digit of the value relative to the aperture APEX value Av or to the exposure value. Similarly, the second decoder 102 and display element 108 are employed for the indication of the second digit of the value relative to the aperture APEX value Av or to the exposure value. The third decoder 104 and display element 110 are employed for the indication of the value appearing for the position of one tenth of the aperture APEX value Av or the exposure value Ev.

Figures 9, 9A:
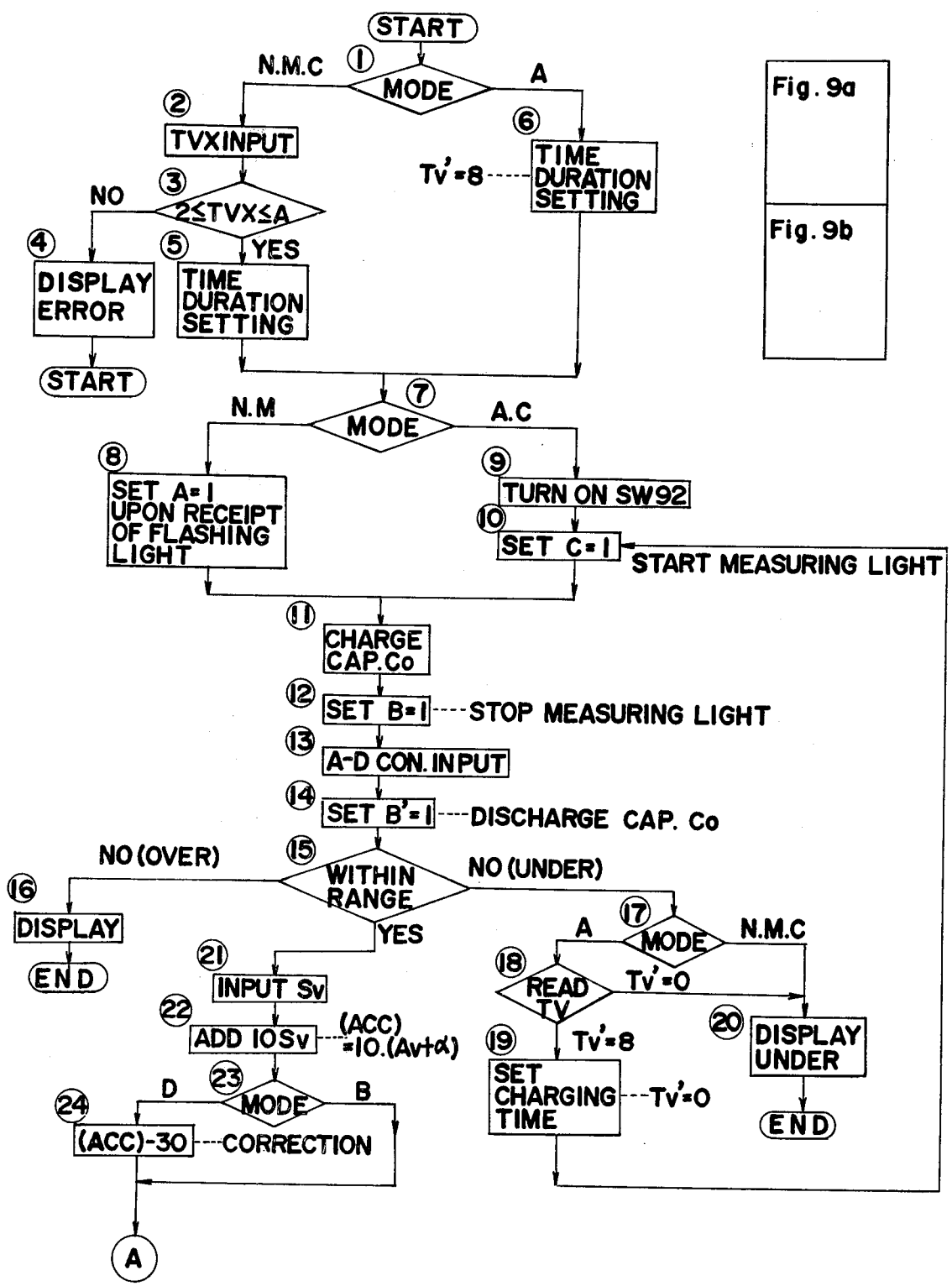
FIGS. 9a and 9b taken together show a flow chart for carrying out the calculation according to the block diagram shown in FIG. 8.
Figure 9B:
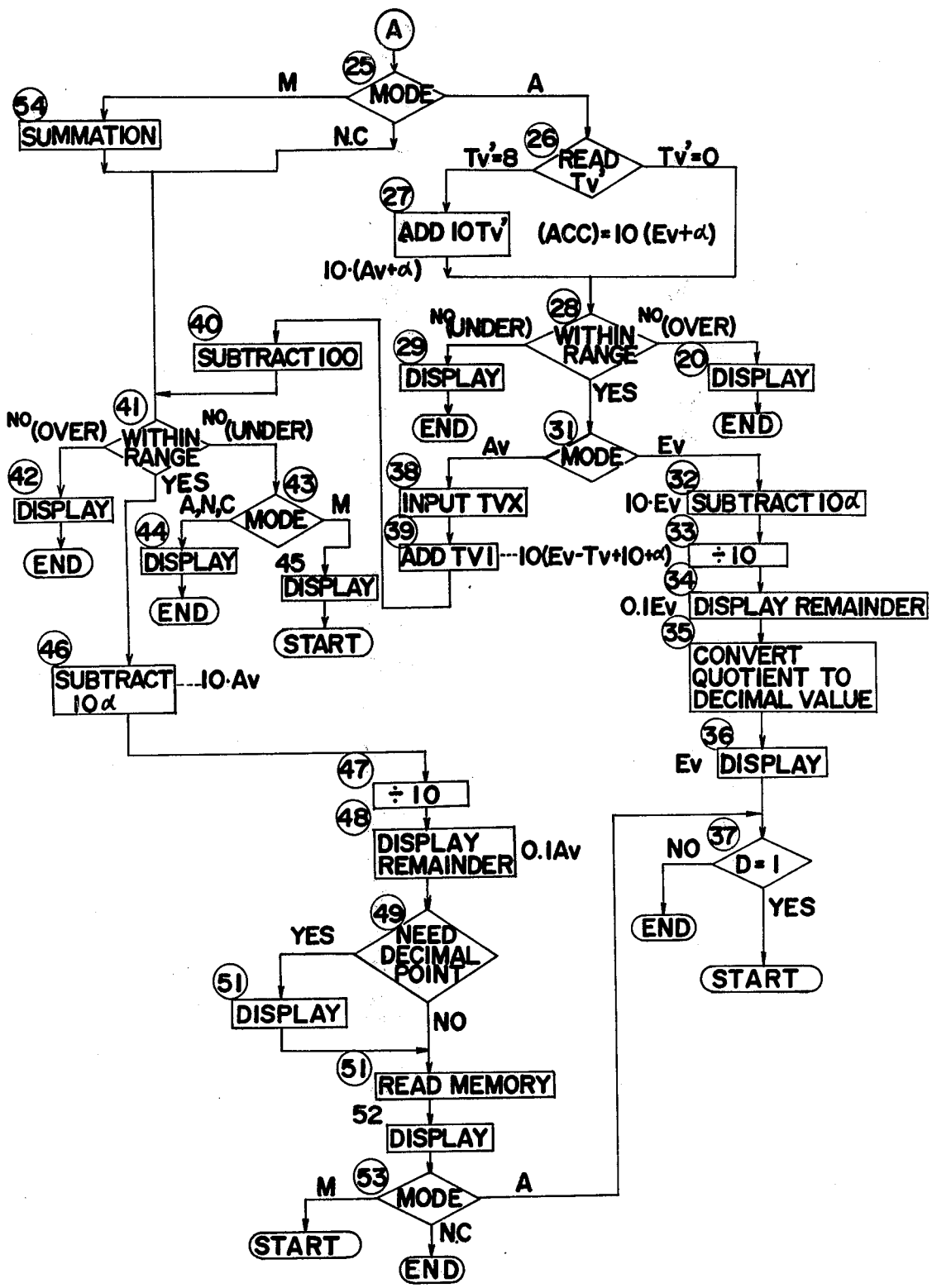

A program according to a flow chart shown in FIGS. 9a and 9b is previously stored in ROM 32. Furthermore, the ROM 32 stores the Tables 1, 2 and 3. The Table 1 includes information relating to the aperture APEX value Av and f/stop number, as described above. Table 2 includes information concerning the film sensitivity, in which the first column thereof lists film sensitivity from high to low in terms of ASA number. In the first column, only the majour ASA numbers such as 3200, 1600, 800, are presented. The intermediate values between the major ASA numbers are given by scaled bars. One of these ASA numbers selected by turning the dial 80 is displayed through the window 78. In the second column indicated as SVX, the listed ASA numbers and the scaled bars are sequentially numbered from 0 to 18 in the hexadecimal numbering system. The number under this second column SVX is produced from the Sv and Tv setting device 6. For example, when the ASA number is set to a value "400", the SV and Tv setting device 6 produces SVX value "09H". The SVX value obtained from the Av and Tv setting device 6 is added to a predetermined constant value $K_1$ for obtaining an address $(K_1+SVX)$ in the ROM 2. The addresses are listed in the third column indicated as SVAdd. From this address, the film sensitivity APEX value Sv is obtained from the ROM 32. For the purpose of further calculation, the value obtained from the ROM 32 is ten times the film sensitivity APEX value Sv, that is, 10·Sv, as shown in Table 2. According to the example described above, that is, when the ASA number is set at a value "400", the obtained address would be $(K_1+09H)$ while the obtained film sensitivity APEX value 10·Sv would be 46H.

Table 3 includes information concerning the shutter speed APEX value, in which the first column thereof lists shutter speed in terms of seconds. One of these shutter speeds selected by turning the dial 74 is displayed through the window 72. In the second column indicated as TVX, the listed shutter speeds are numbered from OH to EH in the hexadecimal numbering system. The number in this second column TVX is produced from the Sv and Tv setting device 6. The value shown in the column TI corresponds to the time set for the capacitor Co in the light meter 86 to charge pulsating current from the light receiving element 82 as a result of firing the strobe. The numbering of the value in the column TI proceeds $2^0:2^1:2^2:2^3:\ldots:2^8$. The value shown in the column TIAdd represents the address in which the time TI is contained. This address is obtained by adding a predetermined constant $K_3$ to the value (TVX-2). It is to be noted that the value TI is given to the shutter speed ranging from 1/250 to 1 sec. The value shown in the column TVI is in relation to the shutter speed APEX value Tv. More particularly, the value shown in the column TVI in the shutter speed range from 1/1000 to 30 is equal to 10(10−Tv). This formula is used for preventing the value in the column TVI from being a negative value. The value shown in the column TVIAdd presents the address at which the value TVI is contained. This address is obtained by adding a predetermined constant $K_4$ to the value TVX.

The operation of the exposure information calculating device is described hereinbelow with reference to the flow chart shown in FIGS. 9a and 9b.

Upon first pushing action of the double action pushing button 66 (FIG. 7), a switch (not shown) is turned on for supplying electric power to the device. First the mode discrimination is carried out in the step 1 to discriminate mode A from the rest of the modes C, N and M. When the device is in the mode A, a signal corresponding to a time of 1/250 sec. is set up in a register contained in the CPU 30. Said time is sufficient for charging the capacitor Co with a current caused by a natural daylight. On the other hand, when the device is set to one of the modes C, N and M, a value in the column TVX of Table 3 is set up and, in turn, is examined to determine whether it is within a range between 2 and A in the step 3. When the TVX value is found to be outside the range, an error display is effected in the step 4 and, in turn, the procedure returns to the start. When the TVX value is found to be within the range, said value is added to a predetermined constant value $K_3$ for obtaining an address where the time for capacitor Co charging is obtained. Accordingly, a value corresponding to $2^{-Tv}$ is set up in a register in the CPU 30 in the step 5.

In the step 7, the mode discrimination is again carried out to discriminate the modes A and C from the modes N and M. When it is determined that the device is either in mode N or M, the high level signal applied to the terminal A from the detecting circuit 84 as a result of detection of step-up of the pulsating current causes the current charge of the capacitor Co in the following step 11. On the other hand, when it is determined that the device is either in mode A or C, the current charge of the capacitor Co is started upon receipt of a high level signal from the terminal C. This high level signal from the terminal C is generated in response to the closure of the switch 92. Particularly, when it is in the mode C, the closure of the switch 92 fires the strobe connected thereto.

In the step 11, the capacitor Co is charged with the pulsating current from the light receiving element 82 for the time defined in either one of the steps 5 or 6. This time duration is counted, according to one preferred embodiment, in the computer in such a manner that one register contained in the computer is set to a predetermined value from which is repeatedly subtracted; a predetermined time interval until said predetermined value reaches zero. Needless to say the predetermined value is related to the value defined in the step 5 or 6.

After the time is over, the terminal B is supplied with a high level signal from the CPU 30 in the step 12 for stopping the charging of the capacitor Co. The charged voltage across the capacitor Co is applied to the A-D converter 4 in which the voltage level obtained as an analog value is converted into a digital value. For the purpose of further calculation in the computer, the value obtained from the A-D converter 4, that is, the value applied to the computer, is equal to $10(Bv-Tv+\alpha)$ in which the value $\alpha$ is so selected as to maintain the value $10(Bv-Tv+\alpha)$ positive. The reason for the value being multiplied by ten is for presenting the value in tens as a value in units so as to facilitate the display of the remainder after the value being divided by ten. It is to be noted that the register contained in the CPU 30 can be used as a counter means in the A-D converter 4. In this case the content of said register can be converted into a digital value for indicating the charged voltage across the capacitor Co.

After the digital value from the A-D converter 4 is read in the CPU 30, in step 14 the terminal B' produces a high level signal for discharging the capacitor Co. Thereafter, the digital value obtained from the A-D converter 4 is examined in step 15 to determine whether or not said digital value (Bv−Tv+α) is within a predetermined range. In the case where the digital value is over the upper limit of the range, the display circuit 94 is actuated in step 16 to indicate that it is over the limit by the lamp 62. Thereafter, the procedure is stopped. On the other hand, when the digital value is under the lower limit of the range, the mode discrimination is carried out in the step 17. When the mode is determined to be mode N, M or C, the display circuit 94 is actuated in step 20 to indicate that the light intensity is under the limit by the lamp 64. Thereafter, the procedure is stopped. In the case where the mode is determined to be mode A in the step 17, it is determined whether the value of Tv' is that determined in the step 6 or in the step 19. When Tv'=0, the display circuit 94 is actuated to indicate that the light intensity is under the limit by the lamp 64 in the step 20 and, thereafter, the procedure is stopped. When Tv'=8, the time for charging the capacitor Co corresponding to Tv'=0 is set and, thereafter, the procedure is repeated from the step 10.

When the digital value $10(Bv-TV+\alpha)$ obtained from the A-D converter 4 is determined to be within the predetermined range in the step 15, SVX value obtained from the Sv and Tv setting device 6 is transmitted to the CPU 30 for obtaining address SVAdd at which the value 10Sv relative to the film sensitivity APEX value corresponding to the set value in the window 78 is contained. In the following step 22, the value 10Sv is added to the value $10(Bv-Tv+\alpha)$ to obtain a value $10(Bv+Sv-Tv+\alpha)$, which is substantially equal to $10(Av+\alpha)$. In the step 23, it is discriminated whether the mode selected by the selecting switch 56 is mode B or mode D. When the switch 56 is positioned in the mode B, the value $10(Av+\alpha)$ is directly processed in the next step 25. However, when the switch 56 is positioned in the mode D, 30 is substracted from the value $10(Av+\alpha)$ because of the consideration that the direct light is greater than the bounched light by approximately 3Ev. Since the light that is received by the camera is bounced light, the value $10(Av+\alpha)$ detected by the direct light is reduced by 30 for obtaining $10(Av+\alpha-3)$.

In the next step 25, the mode discrimination is again carried out. When the mode is determined to be mode A, it is further determined whether the value of the Tv' is 8 or 0. When Tv'=8, a calculation of the following equation is carried out in the step 27:

$$10(Av+\alpha+Tv') = 10(Ev+\alpha)$$

On the other hand, when Tv'=0, since $10(Av+\alpha)=10(Ev+\alpha)$, the procedure moves to the next step 28.

In the next step 28, it is determined whether the value $10(Ev+\alpha)$ is within a predetermined range or not. When the value $10(Ev+\alpha)$ exceeds the upper limit of the range, an indication that it is over the limit is effected in the step 29 and, thereafter, the procedure is stopped. When the value $10(Ev+\alpha)$ falls below the lower limit of the range, an indication that it is under the limit is effected in the step 30 and, thereafter, the procedure is stopped.

When the value $10(Ev+\alpha)$ is determined to be within the predetermined range, it is discriminated in the following step 31 whether the mode selected by the selecting switch 58 is mode Av or mode Ev. When the mode is determined to be mode Ev, first, a calculation $10(Ev+\alpha)-10\cdot\alpha$ is carried out and, then, a calculation $10Ev \div 10$ is carried out. The remainder of this division is supplied through the decoder 104 to the display element 110 in which the digital display of Ev value in tenths is effected. The quotient of the above division is given through the decoders 100 and 102 to the display elements 106 and 108 in which the digital display of the Ev value in units and tens is effected. Thereafter, it is determined whether the switch 92 is on or off in the step 37. When the switch 92 is on, that is, terminal D receives high level signal, the procedure returns to start. On the other hand, when the switch 92 is off, the procedure is stopped.

Back to the step 31, when the mode is determined to be mode Av for the indication of the f/stop number, the value TVX determined by the Sv and Tv setting device 6 is fed to the CPU 30 and is added to the predetermined value $K_4$ for obtaining the address TVIAdd. By using the address, in step 39 the data TVI=10(10−Tv) is read out from the ROM 32 for effecting a calculation $10(Ev+TVI+\alpha)=10(EV-Tv+10+\alpha)=10(Av+10+\alpha)$, and in the step 40 a further calculation $10(Av+10+\alpha)-100=10(Av+\alpha)$ is carried out. The result of this calculation is applied to the step 41. The step 41 also takes the result of the mode discrimination step 25 as mode M, N and C. When it is determined that it is mode M in the step 25, a further step 54 is inserted for providing the sum of all the measured light values to obtain a value $10(Av+\alpha)$.

In the step 41, the value $10(Av+\alpha)$ is examined to determine whether it is within a predetermined range. When the value $10(Av+\alpha)$ is found to be over the upper limit of the range, this is displayed by the display circuit 94 in the step 42. Thereafter, the procedure is stopped. When the value $10(Av+\alpha)$ is found to be under the lower limit of the range, this is displayed by the display circuit 94. Thereafter, the procedure for the mode M is returned to the start while the procedure for the mode A, N or C is stopped. When the value $10(Av+\alpha)$ is found to be within the predetermined range, a calculation $10(Av+\alpha)-10\alpha=10Av$ is carried out in the following step 46 and, thereafter, the flow chart including steps 47 to 52 follows the similar flow chart shown in FIG. 5 for the display of the f/stop number. After the display step 52, it is determined whether the mode is A or M or one of the rest of the modes N or C. When the mode is determined to be the mode M, the procedure is returned to the start for repeating the operation. When the mode is determined to be as the mode N or C, the procedure is ended. When the mode is determined to be as the mode A, the procedure is directed to the step 37.

Although the present invention has been fully described by way of examples with reference to the accompanying drawings, it is to be noted that various changes and modifications will be apparent to those skilled in the art. Therefore, unless otherwise such changes and modifications depart from the true scope of the present invention, they should be construed as being included therein.

What is claimed is:

1. A photographic device for indicating exposure information comprising:

first means responsive to the scene brightness for producing a first exposure information value represented in the ASA APEX system;

second means responsive to a manual setting for producing at least a second exposure information value represented in the ASA APEX system;

third means responsive to the first and second means for calculating a third exposure information value represented in the ASA APEX system from at least the first and second exposure information values, and for separating said third exposure information value into at least a figure composed of an integer component and a fraction component represented in the ASA APEX system;

fourth means having a plurality of addressed memories for storing a series of various values each corresponding to one of a series of various integer components for the figure of the third exposure information in a form to be indicated, respectively;

fifth means for designating one of the addressed memories of the fourth means in response to the integer component of the figure separated by the third means;

sixth means for indicating the value stored in the addressed memory which is designated by the fifth means; and seventh means for indicating the fraction of the figure in accordance with the fraction component separated by the third means.

2. A photographic device as claimed in claim 1, wherein said third and fifth means are constituted by a central processing unit (CPU) and the fourth means is a read only memory (ROM).

3. A photographic device as claimed in claim 2, wherein said seventh means comprises means for decoding the fraction component into a form to be indicated.

4. A photographic device as claimed in claim 3, wherein said seventh means further comprises means responsive to the decoding means for indicating the fraction component by means of seven-segment figure indicator.

5. A photographic device as claimed in claim 3 further comprising eighth means having a plurality of addressed memories for storing a series of various values each corresponding to one of a series of various fraction components for the figure of the third exposure information value in a form to be indicated, and wherein seventh means comprises means for designating one of the addressed memories of the eighth means in response to the fraction component of the figure separated by the third means to indicate the value stored in the addressed memory which is designated by the designating means in the seventh means.

6. A photographic device as claimed in claim 1, wherein said first exposure information value is a luminance value.

7. A photographic device as claimed in claim 6, wherein said second exposure information value is a film sensitivity value.

8. A photographic device as claimed in claim 7, wherein said second means further comprises means capable of producing a fourth exposure information value represented in the ASA APEX system in response to the manual setting and said third means further comprises means responsive to the fourth exposure information value to calculate the third exposure information value.

9. A photographic device as claimed in claim 8, wherein said third and fourth exposure information values are a time value and an aperture value, respectively.

10. A photographic device as claimed in claim 8, wherein said third and fourth exposure information values are an aperture value and a time value, respectively.

11. A photographic device as claimed in claim 1, wherein said third exposure information value is derived from the figure multiplied by a predetermined integer.

12. A photographic device as claimed in claim 11, wherein said third means comprises means for dividing the third exposure information value by the predetermined integer, means for producing the integer component of the figure in response to the quotient of the division by the dividing means and means for producing the fraction component of the figure in response to the remainder of the division.

* * * * *